United States Patent
Chang et al.

(10) Patent No.: US 11,675,833 B2
(45) Date of Patent: Jun. 13, 2023

(54) METHOD AND SYSTEM FOR RECOMMENDING CONTENT

(71) Applicant: YAHOO ASSETS LLC, New York, NY (US)

(72) Inventors: Shiyu Chang, San Jose, CA (US); Jiliang Tang, San Jose, CA (US); Dawei Yin, San Jose, CA (US); Yi Chang, Sunnyvale, CA (US)

(73) Assignee: YAHOO ASSETS LLC, New York, NY (US)

( * ) Notice: Subject to any disclaimer, the term of this patent is extended or adjusted under 35 U.S.C. 154(b) by 468 days.

(21) Appl. No.: 14/983,663

(22) Filed: Dec. 30, 2015

(65) Prior Publication Data

US 2017/0193106 A1    Jul. 6, 2017

(51) Int. Cl.
| | | |
|---|---|---|
| G06F 7/00 | (2006.01) |
| G06F 16/735 | (2019.01) |
| H04L 67/02 | (2022.01) |
| G06F 16/78 | (2019.01) |
| G06F 16/738 | (2019.01) |
| G06F 16/2457 | (2019.01) |
| G06F 16/9032 | (2019.01) |
| G06F 16/435 | (2019.01) |
| H04L 67/1074 | (2022.01) |

(52) U.S. Cl.
CPC ...... *G06F 16/735* (2019.01); *G06F 16/24578* (2019.01); *G06F 16/435* (2019.01); *G06F 16/738* (2019.01); *G06F 16/78* (2019.01); *G06F 16/90324* (2019.01); *H04L 67/02* (2013.01); *H04L 67/1085* (2013.01)

(58) Field of Classification Search
CPC ............. G06F 17/30828; G06F 16/735; G06F 16/435; G06F 16/738; G06F 16/24578; G06F 16/78; G06F 16/90324; H04L 67/02; H04L 67/1085
USPC ........................................ 707/748, 738, 769
See application file for complete search history.

(56) References Cited

U.S. PATENT DOCUMENTS

| | | | |
|---|---|---|---|
| 6,947,922 B1 | 9/2005 | Glance | |
| 7,908,183 B2 | 3/2011 | Jacobi et al. | |
| 8,095,521 B2 | 1/2012 | Chan | |
| 8,745,074 B1* | 6/2014 | Covell | G06F 16/9535 707/758 |
| 8,995,716 B1* | 3/2015 | Zomet | G06F 16/583 382/103 |
| 9,129,227 B1* | 9/2015 | Yee | G06N 3/0472 |
| 10,079,876 B1* | 9/2018 | Chung | H04W 4/60 |
| 2006/0282856 A1* | 12/2006 | Errico | H04N 21/4661 348/E7.071 |

(Continued)

*Primary Examiner* — Md I Uddin
(74) *Attorney, Agent, or Firm* — Venable LLP

(57) ABSTRACT

The present teaching relates to recommending content by analyzing the streamed data. A request is received from a user requesting one or more recommendations from a set of items. A first distribution indicative of an interest distribution of the user in a plurality of topics is obtained. For each item, a second distribution indicative of a classification distribution of the item with respect to the plurality of topics is obtained. A score is estimated based on the first distribution and the second distribution, wherein the score indicates likelihood that the user is interested in the item. The scores associated with the set of items are ranked. The one or more recommendations are presented based on the ranked scores.

14 Claims, 14 Drawing Sheets

(56) References Cited

U.S. PATENT DOCUMENTS

| | | | |
|---|---|---|---|
| 2009/0049053 A1* | 2/2009 | Barker | G06F 16/2308 |
| 2009/0100015 A1* | 4/2009 | Golan | G06F 16/9535 |
| 2009/0138326 A1* | 5/2009 | Shi | H04N 21/44222 |
| | | | 705/1.1 |
| 2009/0299981 A1* | 12/2009 | Nagasaka | G11B 27/322 |
| 2010/0262615 A1* | 10/2010 | Oztekin | G06F 16/353 |
| | | | 707/E17.046 |
| 2011/0040752 A1* | 2/2011 | Svore | G06F 16/338 |
| | | | 707/E17.014 |
| 2012/0047163 A1* | 2/2012 | Farrell | G06F 40/186 |
| | | | 707/769 |
| 2012/0089621 A1* | 4/2012 | Liu | G06F 16/335 |
| | | | 707/E17.084 |
| 2013/0253994 A1* | 9/2013 | Brower | G06Q 30/02 |
| | | | 705/12 |
| 2015/0020106 A1* | 1/2015 | Belyaev | H04N 21/44008 |
| | | | 725/48 |
| 2015/0066940 A1* | 3/2015 | Fernandes | G06F 16/9535 |
| | | | 707/E17.046 |
| 2015/0189354 A1* | 7/2015 | Jin | H04N 21/4758 |
| | | | 725/24 |
| 2015/0363407 A1* | 12/2015 | Huynh | G06F 16/35 |
| | | | 707/738 |
| 2016/0012053 A1* | 1/2016 | Weening | G06Q 10/107 |
| | | | 707/723 |
| 2016/0078488 A1* | 3/2016 | Simo | G06Q 30/0269 |
| | | | 705/14.66 |
| 2016/0124614 A1* | 5/2016 | Bromberg | H04L 67/306 |
| | | | 715/733 |
| 2016/0132906 A1* | 5/2016 | Khavronin | G06Q 30/0201 |
| | | | 705/7.29 |
| 2016/0154887 A1* | 6/2016 | Zhao | G06F 16/435 |
| | | | 707/723 |
| 2016/0210321 A1* | 7/2016 | Gong | H04N 21/4668 |
| 2016/0224557 A1* | 8/2016 | Chi | G06F 16/972 |
| 2016/0267167 A1* | 9/2016 | Finn | G06F 16/9537 |
| 2016/0379123 A1* | 12/2016 | Younessian | G06Q 50/01 |
| | | | 706/52 |
| 2017/0124061 A1* | 5/2017 | Amerige | H04L 67/42 |
| 2017/0124590 A1* | 5/2017 | Griesmeyer | G06Q 30/0241 |
| 2017/0132314 A1* | 5/2017 | Liu | G06F 16/338 |
| 2017/0161667 A1* | 6/2017 | Eulenstein | G06Q 50/01 |
| 2017/0171342 A1* | 6/2017 | Wang | H04L 67/2842 |
| 2017/0185601 A1* | 6/2017 | Qin | G06Q 50/01 |
| 2017/0185666 A1* | 6/2017 | Pasternack | G06F 16/951 |
| 2017/0228810 A1* | 8/2017 | Shang | G06Q 10/067 |
| 2017/0251070 A1* | 8/2017 | Liu | H04L 67/22 |
| 2017/0344572 A1* | 11/2017 | Peterson | G06F 16/93 |

* cited by examiner

METHOD AND SYSTEM FOR RECOMMENDING CONTENT

1. TECHNICAL FIELD

The present teaching relates to methods, systems, and programming for recommending content over the internet. In particular, the present teaching relates to methods, systems, and programming for streaming recommending content over the internet.

2. DISCUSSION OF TECHNICAL BACKGROUND

Recommender systems help to overcome information overload by providing personalized suggestions from a plethora of choices based on the historical data. The pervasive use of real-world recommender systems such as eBay and Netflix generates massive data in an unprecedented rate. For example, more than ten million transactions are made per day in eBay and Netflix gained more than three million subscribers from mid-March in 2013 to April in 2013. Such data is temporally ordered, continuous, high-velocity and time varying, which determines the streaming nature of data in recommender systems. Hence, it is more realistic to study recommender systems in streaming scenarios.

In recent years, there are a large number of literatures exploiting temporal information and it is evident that explicitly modeling temporal dynamics greatly improves the recommendation performance. However, the vast majority of those systems do not consider the input data as streams. Recommendation under streaming settings faces new challenges.

One challenge is real-time updating. The inherent characteristic of data streams is its high velocity; hence the recommender system needs to update and response timely in order to catch users' instant intention and demands. However, many recommendation schemes analyze the new coming data and update their models at regular time intervals (e.g., every day or every few days).

Another challenge is unknown size. New users or fresh posted items arrive continuously in data streams. For example, there were more than twenty one million new products offered on the main Amazon USA websites from December 2013 to August 2014; and more than nine new products are listed in their websites every second. Hence the number of users and the size of recommendation lists are unknown in advance. Nevertheless, many existing algorithms assume the availability of such information.

Yet another challenge is concept shift. The natural tendency of evolution in data streams leads to concept shifts. The emerging of new items in data streams could result in changes of items' characteristics. For example, the new launched version of iPhone could reduce the popularity of its previous versions. Likewise, user preferences could drift over time. For instance, users may change their favorite genre in Netflix. The recommender system should have the ability to capture such signals and make fast responses to their recommendations accordingly.

Therefore, there is a need to provide an improved solution for recommending content to tackle the above-mentioned challenges.

SUMMARY

The present teaching relates to methods, systems, and programming for recommending content over the internet. In particular, the present teaching relates to methods, systems, and programming for streaming recommending content over the internet.

According to an embodiment of the present teaching, a method implemented on a computer device having at least one processor, storage, and a communication platform connected to a network for recommending content comprises receiving a request from a user requesting one or more recommendations from a set of items; obtaining a first distribution indicative of an interest distribution of the user in a plurality of topics; obtaining, for each item, a second distribution indicative of a classification distribution of the item with respect to the plurality of topics; estimating a score based on the first distribution and the second distribution, wherein the score indicates a likelihood that the user is interested in the item; ranking the scores associated with the set of items; and providing the one or more recommendations based on the ranked scores.

In some embodiments, the first distribution is determined in real-time based on the user's activities related to the set of items observed up to a moment when the request is received.

In some embodiments, the second distribution is determined in real-time based on the user and other users' activities related to the item observed up to a moment when the request is received.

In some embodiments, the score is estimated in real-time based on a perturbation factor observed up to a moment when the request is received, wherein the perturbation factor indicates a variation of the likelihood that the user is interested in the item.

In some embodiments, the method further comprises receiving information associated with a new user; obtaining a first reference distribution indicative of an average interest distribution of existing users in the plurality of topics; assigning the first reference distribution to the new user; and updating the existing users.

In some embodiments, the method further comprises receiving information associated with a new item; obtaining a second reference distribution indicative of an average classification distribution of existing items with respect to the plurality of topics; assigning the second reference distribution to the new item; and updating the existing items.

According to another embodiment of the present teaching, a system having at least one processor, storage, and a communication platform for recommending content comprises a data interface configured to receive a request from a user requesting one or more recommendations from a set of items; a user interest distribution retriever configured to obtain a first distribution indicative of an interest distribution of the user in a plurality of topics; an item classification distribution retriever configured to obtain, for each item, a second distribution indicative of a classification distribution of the item with respect to the plurality of topics; a user-item correlation estimation module configured to estimate a score based on the first distribution and the second distribution, wherein the score indicates a likelihood that the user is interested in the item; a ranking module configured to rank the scores associated with the set of items; and a recommendation module configured to provide one or more recommendations based on the ranked scores.

In some embodiments, the data interface is further configured to receive information associated with a new user, and the system further comprises a user interest reference retriever configured to obtain a first reference distribution indicative of an average interest distribution of existing users in the plurality of topics; a user interest initializing module configured to assign the first reference distribution to the new user; and a first updating module configured to update the existing users.

In some embodiments, the data interface is further configured to receive information associated with a new item, and the system further comprises an item classification reference retriever configured to obtain a second reference distribution indicative of an average classification distribution of existing items with respect to the plurality of topics; an item classification initializing module configured to assign the second reference distribution to the new item; and a second updating module configured to update the existing items.

In some embodiments, the data interface is further configured to receive a new rating of an existing item from an existing user, and the system further comprises a first updating module configured to update the first distribution associated with the existing user based on the new rating; a second updating module configured to update the second distribution associated with the existing item based on the new rating; and a third updating module configured to update information related to the likelihood that the existing user is interested in the existing item based on the new rating.

According to yet another embodiment of the present teaching, a non-transitory machine-readable medium having information recorded thereon for recommending content, wherein the information, when read by the machine, causes the machine to perform receiving a request from a user requesting one or more recommendations from a set of items; obtaining a first distribution indicative of an interest distribution of the user in a plurality of topics; obtaining, for each item, a second distribution indicative of a classification distribution of the item with respect to the plurality of topics; estimating a score based on the first distribution and the second distribution, wherein the score indicates a likelihood that the user is interested in the item; ranking the scores associated with the set of items; and providing the one or more recommendations based on the ranked scores.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
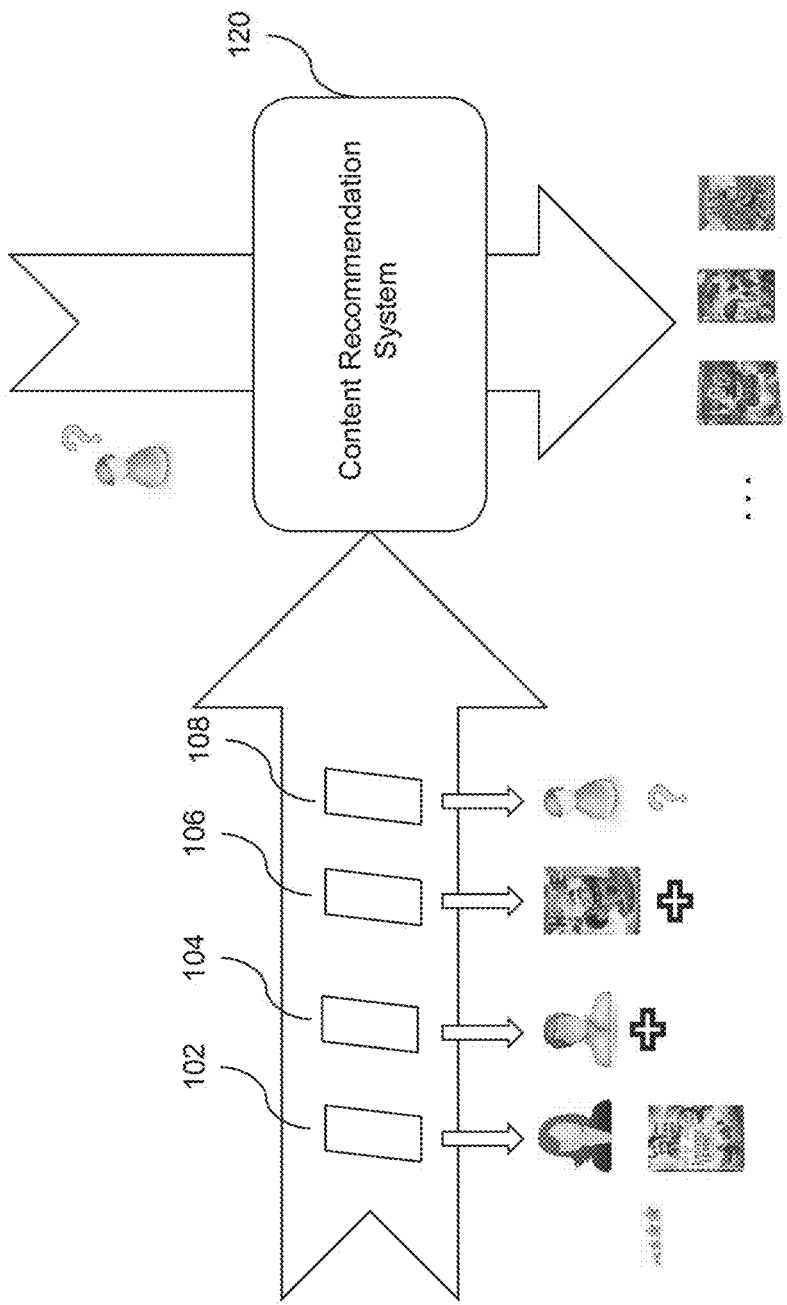
FIG. 1 illustrates an exemplary system diagram for recommending content by analyzing real-time data stream, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present teaching utilizes distinct properties related to data stream such as temporally ordered, continuous and high-velocity to recommend content over the network in real-time. The input streams are modeled as three types of events: user feedback activities, new users and new item introductions. Under the streaming scenarios, the content recommendation system continuously updates its model to capture dynamics and pursue real-time recommendations. User-item engagements are deemed as dynamic and inherently changing according to the time. To achieve this, the content recommendation system is modeled as a continuous-time Gaussian process. Further, the varying temporal dynamics of user interest and hidden topics are modeled as Brownian motion. The present teaching specifically deals with the introduction of new users and/or items as the average of the posterior expectations of all existing users at the birth time with Gaussian perturbations. The continuous-time random process employed in the present teaching is efficient and effective in tracking the dynamic changes of user, item, and user-item engagement as well as providing real-time recommendations to the user.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 illustrates an exemplary system diagram for recommending content by analyzing real-time data stream, according to an embodiment of the present teaching. Data stream to a content recommendation system 120 according to the illustrated embodiment may be modeled as three types of events: user feedback activity 102, new user 104, and new item 106. User feedback activity 102 may be a rating from the user on an item of content recommendation system 120, an operation indicative of the likeness of the user on the item, a comment inputted by the user with respect to the item, an operation indicative of further actions taken by the user such as sharing to other friends, saving to my profile, etc. User feedback activity 102 may include any type of user activities associated with the user and the item, and the present teaching is not intended to be limiting. New user 104 may be a newly registered user to the content recommendation system or a guest that visits the content recommendation system without registration. New item 106 may be any type of information that is provided via the content recommendation system including but not limited to news, a movie/a piece of video or audio/any multimedia product, book, magazine, advertisement, and any product offered for sale and/or exchange via the content recommendation system. Data stream to a content recommendation system 120 may further include a user request 108 for recommendations on content provided via the content recommendation system. User request 108 may be a direct input from the user such as a question or a query. In some embodiments, user request 108 may be inferred request based on the activities of the user on the content recommendation system. For example, if the user is browsing a category of action movies, the content recommendation system may infer that the user is interested to receive one or more recommendations on action movies or on similar type of movies.

Figure 2:
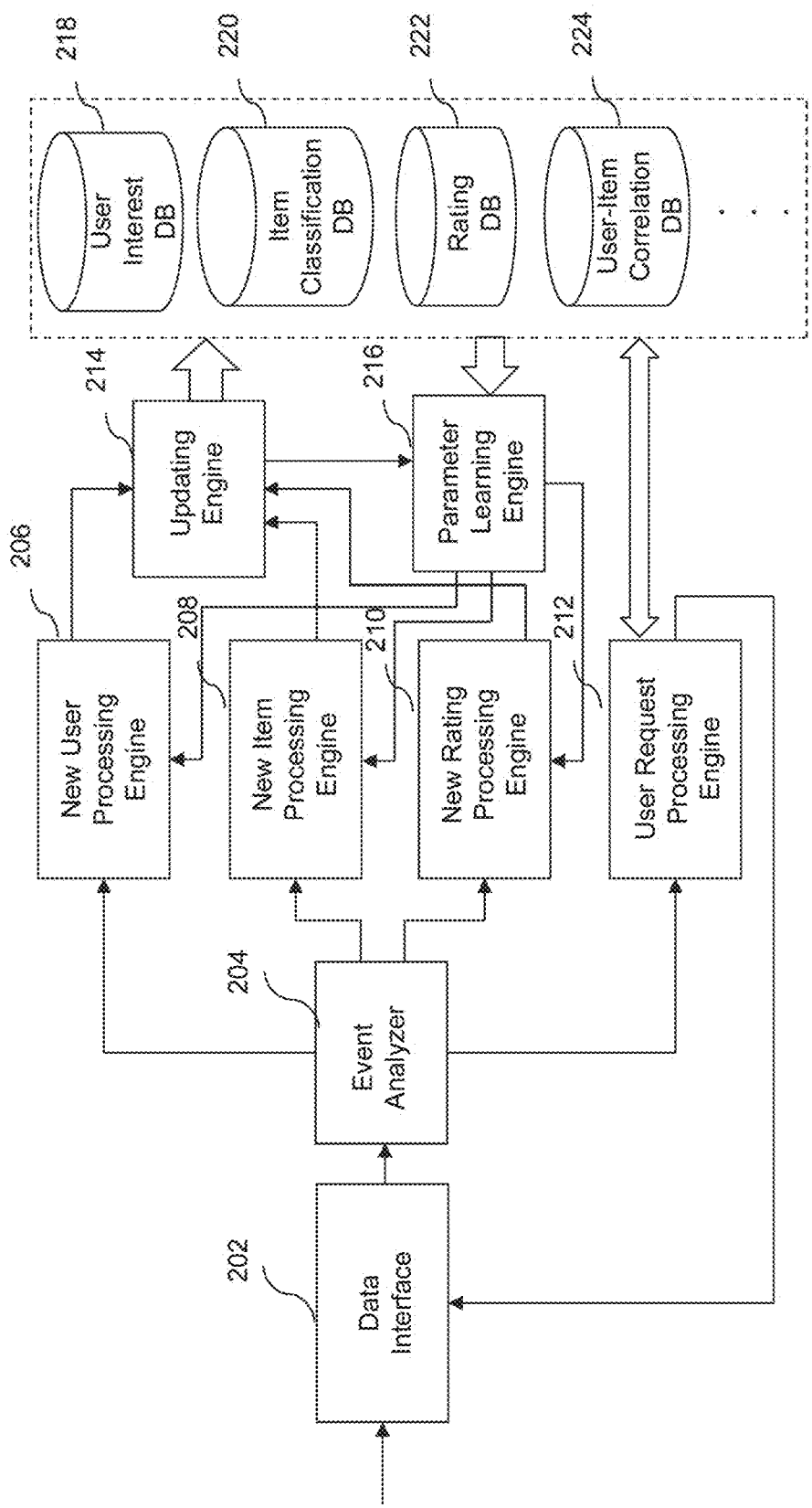
FIG. 2 illustrates an exemplary system diagram of a content recommendation system, according to another embodiment of the present teaching.

FIG. 2 illustrates an exemplary system diagram of a content recommendation system, according to another embodiment of the present teaching. The content recommendation system 120 illustrated in FIG. 1 may include a data interface 202, an event analyzer 204, a new user processing engine 206, a new item processing engine 208, a new rating processing engine 210, and a user request processing engine 212. Data interface 202 is configured to receive the streamed events associated with content recommendation system 120. Data interface 202 may be a webpage associated with the content recommendation system and any real-time activities occurred on the webpage are collected as the streamed events. In some embodiments, data interface 202 may be an application interface implemented on a computing device, such as a smart phone, a tablet, an Apple TV, an Amazon Fire TV, a networked blue-ray DVD player, etc. In yet another embodiment, data interface 202 may be a user interface implemented on a server device that is configured to administrate the database associated with the content recommendation system, such as a Netflix server etc. A system administrator may regularly or randomly update the movie inventory of Netflix on the server device. Event analyzer 204 is configured to analyze the streamed events and determine what type of events that a detected event belongs to. Based on the determination, different types of events are forwarded to one of new user processing engine 206, new item processing engine 208, new rating processing engine 210, and user request processing engine 212 for further processing. For example, if an event is determined as a new user to the content recommendation system, it is forwarded to new user processing engine 206 for processing; if an event is determined as a new item to the content recommendation system, it is forwarded to new item processing engine 208 for processing; if an event is determined as a new rating to the content recommendation system, it is forwarded to new rating processing engine 210 for processing; and if an event is determined as a user request to the content recommendation system, it is forwarded to user request processing engine 212 for processing.

In some embodiments, content recommendation system 120 illustrated in FIG. 1 may further include an updating engine 214 and a parameter learning engine 216. In order to process the streamed events, content recommendation system 120 may retrieve one or more parameters related to the users, items, ratings, and/or other related information from one or more of a user interest database 218, an item classification database 220, a rating database 222, and a user-item correlation database 224. For example, one or more parameters related to the users may include one or more distribution values indicative of an average interest distribution of the users on a plurality of topics, and one or more parameters related to the items may include one or more distribution values indicative of an average distribution of the items being classified into the plurality of topics. The one or more parameters may also include an average rating of the user on an item over a period of time, and user-item bonding value indicative of the user-item correlation over a period of time. It should be understood that the one or more parameters may be based on historical information at a moment of time; however, the one or more parameters are updated dynamically according to the real-time event processing. Further, after he streamed events are processed, information is updated to the respective database via updating engine 215. Information retrieved and updated to those databases include but not limited to personal information related to the user, information related to the item, information related to the rating of an item, user interest on the items provided by the content recommendation system individually or in average, item genre distribution individually or in average across all items provided by the content recommendation system in average, user-item interest bonding for each individual user and item, etc. The components of the content recommendation system and the types of databases in FIG. 2 are for illustrative purpose only. The present teaching is not intended to be limiting and may include more or less components and/or databases than illustrated.

Figure 3:
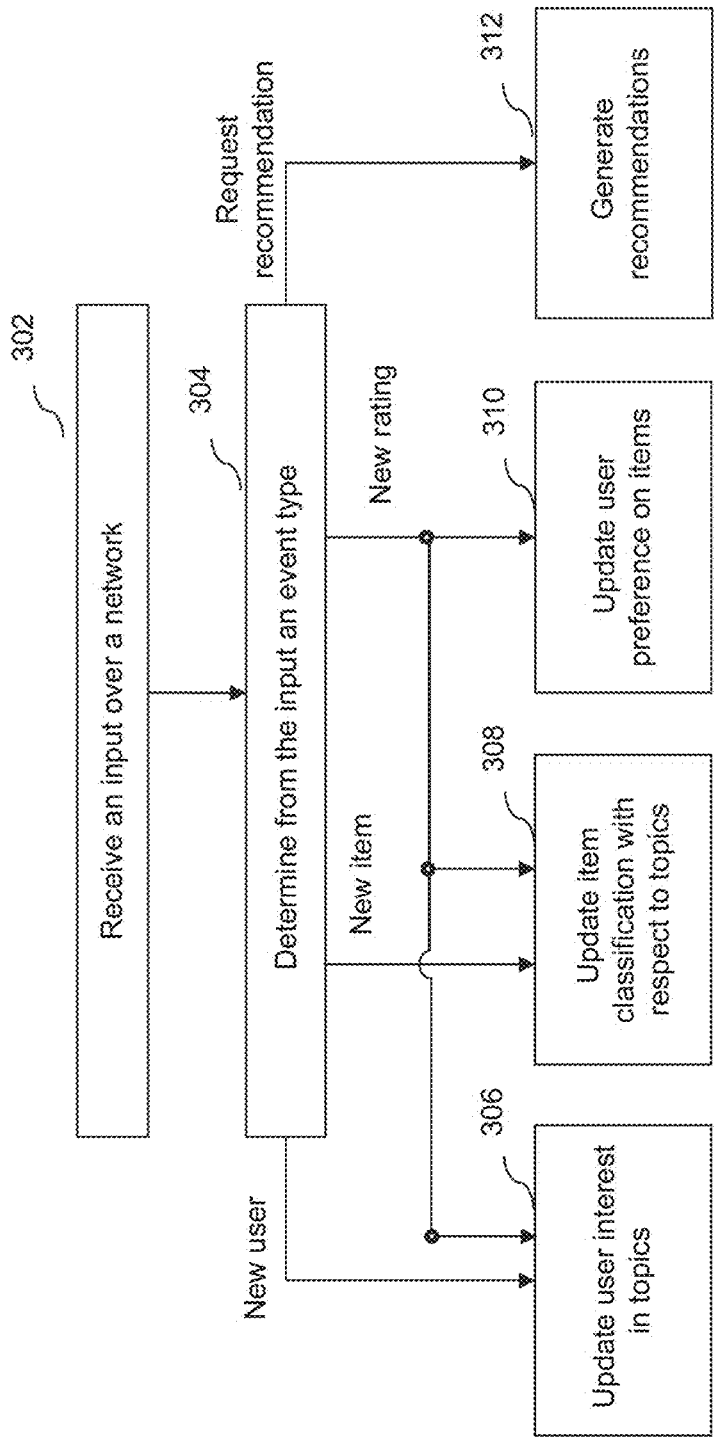
FIG. 3 illustrates an exemplary flowchart of the content recommendation system, according to an embodiment of the present teaching.

FIG. 3 illustrates an exemplary flowchart of the content recommendation system, according to an embodiment of the present teaching. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 3 and described below is not intended to be limiting. At 302, an input over a network is received; at step 304, a determination is made as to what type of event that the input includes; at 306, if it is determined that the input is related to a new user, the user interest in topics is updated; at 308, if it is determined that the input is related to a new item, the item classification with respect to topics is updated; at 310, if it is determined that the input is related to a new rating, the user preference on items is updated; and at 312, if it is determined that the input is related to a request for recommendation, one or more recommendations of items are generated.

Figure 4:
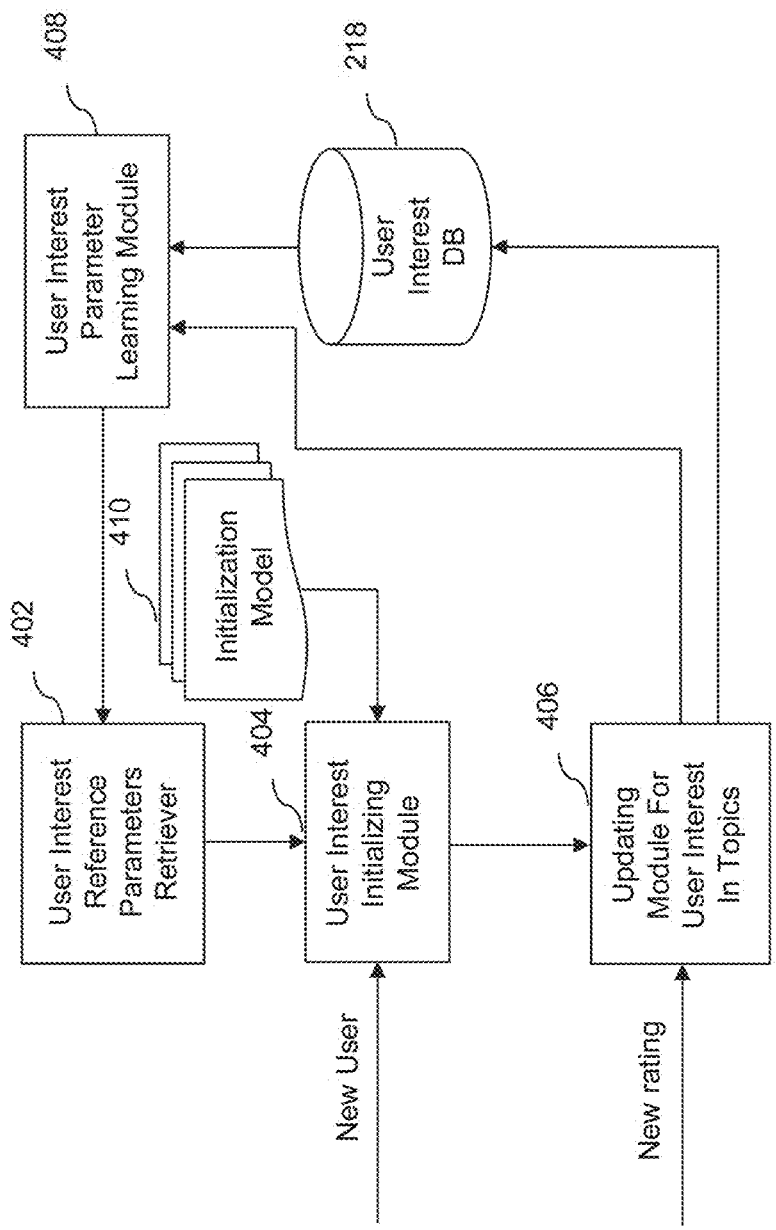
FIG. 4 illustrates an exemplary system diagram of a content recommendation system when the event from the data stream is determined to be a new user.

FIG. 4 illustrates an exemplary system diagram of a content recommendation system when the event from the data stream is determined to be a new user. The content recommendation system as illustrated includes a user interest reference retriever 402, a user interest initializing module 404 and an updating module for user interest in topics 406. User interest initializing module 404 is configured to assign one or more user interest reference values to a new user. As the new user's interest is unknown to the content recommendation system, user interest reference retriever 402 retrieves the user interest reference based on information related to existing users from user interest database 218. The user interest reference may be an average evaluation of the user interest on a plurality of topics for all existing users, and are used to indicate the new user's initial interest on the plurality of topics. For example, if the plurality of topics includes action, thriller, family, kids, comedy, an average evaluation of all existing users indicates that an average interest of all users falls in the topic of comedy with deviations to topics other than comedy. In some embodiments, if the user's interest on the plurality of topics is modeled as a normal distribution, the user interest reference may include a mean value and a standard deviation of the normal distribution. Updating module for user interest in topics 406 is configured to update information and initial assignment related to the new user to user interest database 218. In some embodiments, when a new rating is received from an existing user or the new user on a particular item, updating module for user interest in topics 406 may also update user interest database 218 based on the new rating. The user's interest on the plurality of topics is updated dynamically once the events in the data stream are processed, and therefore, the user interest distribution on the plurality of topics and the user interest reference are updated dynamically.

In some embodiments, the content recommendation system may further include an initialization model 410 and a user interest parameter learning module 408. Initialization model 410 is configured to define one or more conditions that the new user's interest is initialized. In some embodiments, initialization model 410 may define that the new user's interest is initialized based on a period of time such as in the past three months, in all evening time periods of the past three months, etc. In another embodiment, initialization model 410 may define that the new user's interest is initialized based on the new user's gender and age. For example, if the new user is a female in her 40's, the initialization may be based on data related to all existing female users in 40's. In yet another embodiment, initialization model 410 may define that the new user's interest is initialized based on the user's locale information. For example, if the new user is located in Seattle, Wash., the initialization may be based on data related to all existing users residing in Seattle, Wash. In yet another embodiment, initialization model 410 may define that the new user's interest is initialized based on the user's social activity information related to one or more social networks or environments. In yet another embodiment, the initialization may be based on a combination of one or more conditions, and the one or more conditions described above are only for illustrative. Any information related to the user may be considered to be an initialization condition.

User interest parameter learning module 408 is configured to generate the one or more user interest reference values based on the user information and one or more initialization conditions from user interest database 218. The one or more parameters may be generated offline using historical data related to existing users, existing items, and user-item correlations.

Figure 5:
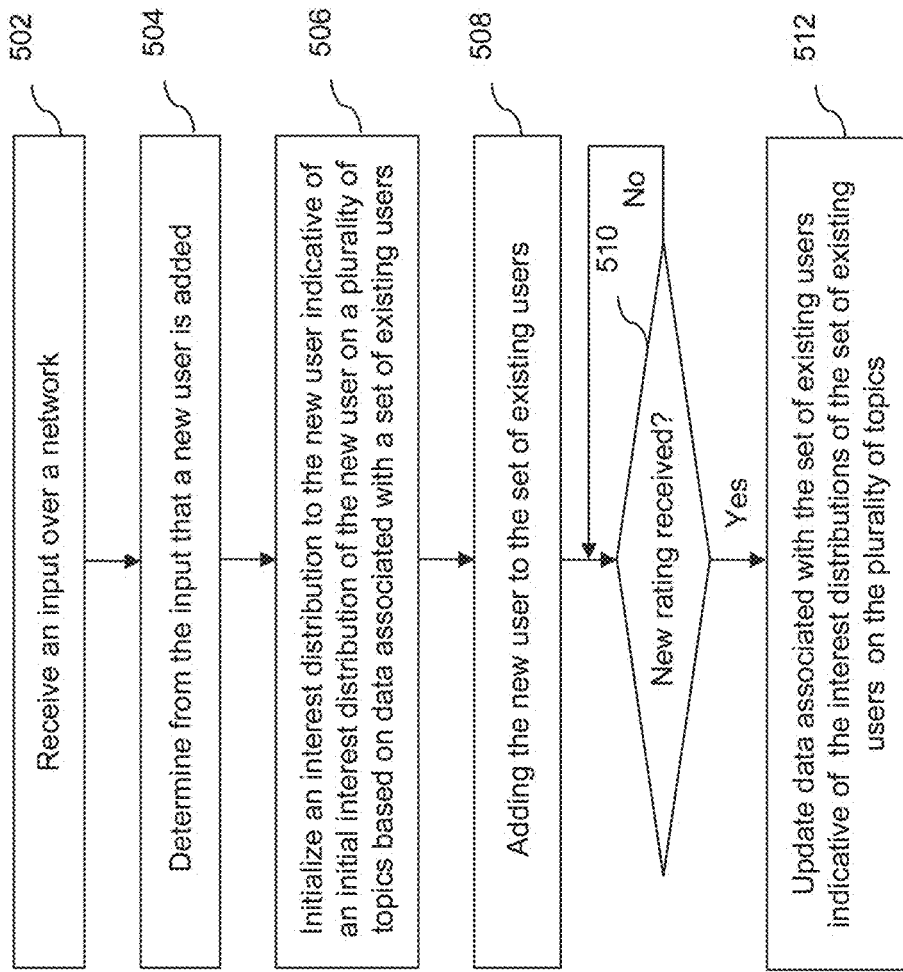
FIG. 5 illustrates an exemplary flowchart of the content recommendation system when the event from the data stream is determined to be a new user.

FIG. 5 illustrates an exemplary flowchart of the content recommendation system when the event from the data stream is determined to be a new user. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 5 and described below is not intended to be limiting. At 502, an input is received from a network; at 504, a determination is made that the input is related to a new user; at 506, an interest distribution is initialized with respect to the new user indicative of an initial interest distribution of the new user on a plurality of topics based on data associated with a set of existing users; at 508, the new user is added to the set of existing users; at 510, a determination is made as to whether a new rating is made by the new user; and at 512, data associated with the set of existing users is updated indicative of the interest distributions of the set of existing users on the plurality of topics.

Figure 6:
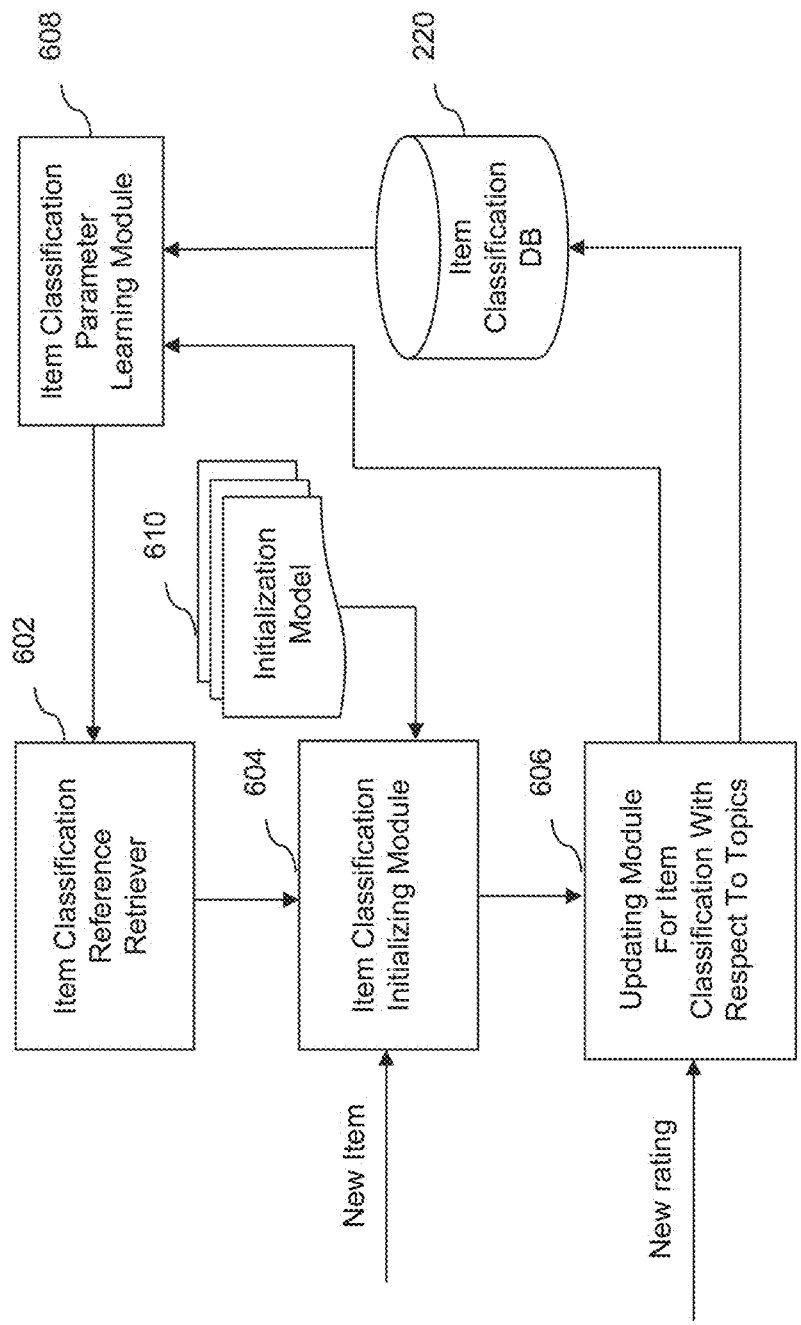
FIG. 6 illustrates an exemplary system diagram of a content recommendation system when the event from the data stream is determined to be a new item.

FIG. 6 illustrates an exemplary system diagram of a content recommendation system when the event from the data stream is determined to be a new item. The content recommendation system as illustrated includes an item classification reference retriever 602, an item classification initializing module 604 and an updating module for item classification with respect to topics 406. Item classification initializing module 404 is configured to assign one or more item classification reference values with respect to a plurality of topics to a new item. As the new item's genre is unknown to the content recommendation system, item classification reference retriever 602 retrieves the item classification reference based on information related to existing items from item classification database 220. The item classification reference may be an average evaluation of all existing items with respect to a plurality of topics, and are used to indicate the new item's initial classification with respect to the plurality of topics. Updating module for item classification with respect to topics 606 is configured to update information and initial assignment related to the new item to item classification database 220. In some embodiments, when a new rating is received from an existing user with respect to the new item, updating module for item classification with respect to topics 606 may also update item classification database 220 based on the new rating.

In some embodiments, the content recommendation system may further include the initialization model 410 and an item classification parameter learning module 608. Further to the description of initialization model 410 in FIG. 4, initialization model 410 is configured to define one or more conditions that the new item's classification with respect to topics with respect to topics is initialized. In some embodiments, initialization model 410 may define the new item's classification based on a period of time such as in the past six months or in the last year, etc. In another embodiment, when the new item is a newly released movie, initialization model 410 may define the new item's classification with respect to topics based on information associated with the director, the actor, the actress, and/or other roles in the movie. For example, if the actor in leading role of the new item is Arnold Schwarzenegger, the initialization may be based on an average classification of all Schwarzenegger's movies in item classification database 220. In yet another embodiment, initialization model 410 may define the new item's classification with respect to topics based on the new item's source. For example, if the new item is provided by a source with mostly cartoon movies, the initialization may be based on an average classification of all cartoon movies in item classification database 220. In yet another embodiment, initialization model 410 may define the new item's classification with respect to topics based on the new item's social popularities among various social networks or environments. For example, if the new item is a piece of published news and is rated as the mostly liked news in a financial-type website, initialization model 410 may define the new item's classification with respect to topics by reference to the classification of all financial-type news in item classification database 220. In yet another embodiment, the initialization may be based on a combination of one or more conditions, and the one or more conditions described above are only for illustrative. Any information related to the item may be considered to be an initialization condition. Item classification parameter learning module 608 is configured to generate the one or more item classification reference values based on the new item information and one or more initialization conditions from item classification database 220.

Figure 7:
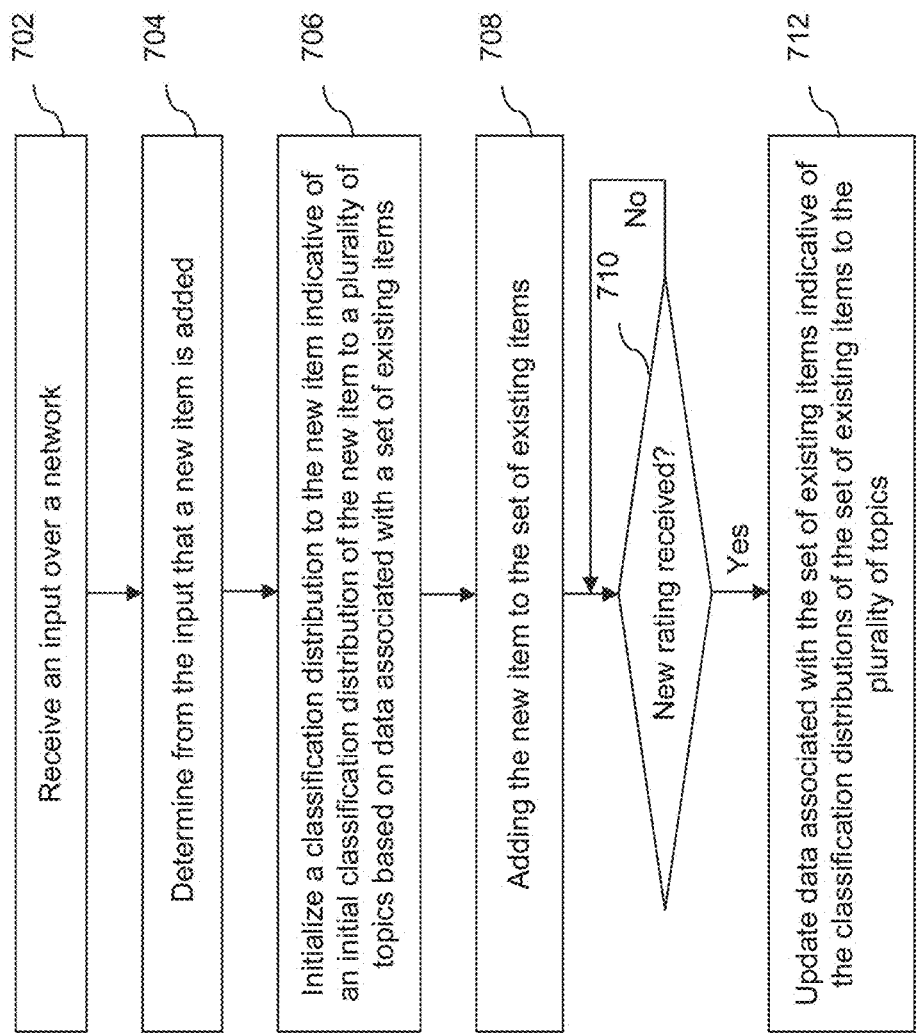
FIG. 7 illustrates an exemplary flowchart of the content recommendation system when the event from the data stream is determined to be a new item.

FIG. 7 illustrates an exemplary flowchart of the content recommendation system when the event from the data stream is determined to be a new item. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 7 and described below is not intended to be limiting. At 702, an input is received from a network; at 704, a determination is made that the input is related to a new item; at 706, a classification distribution to the new item is initialized indicative of an initial classification distribution of the new item to the plurality of topics based on data associated with a set of existing items; at 708, the new item is added to the set of existing items; at 710, a determination is made as to whether a new rating is made with respect to the new item; and at 712, data associated with the set of existing items is updated.

Figure 8:
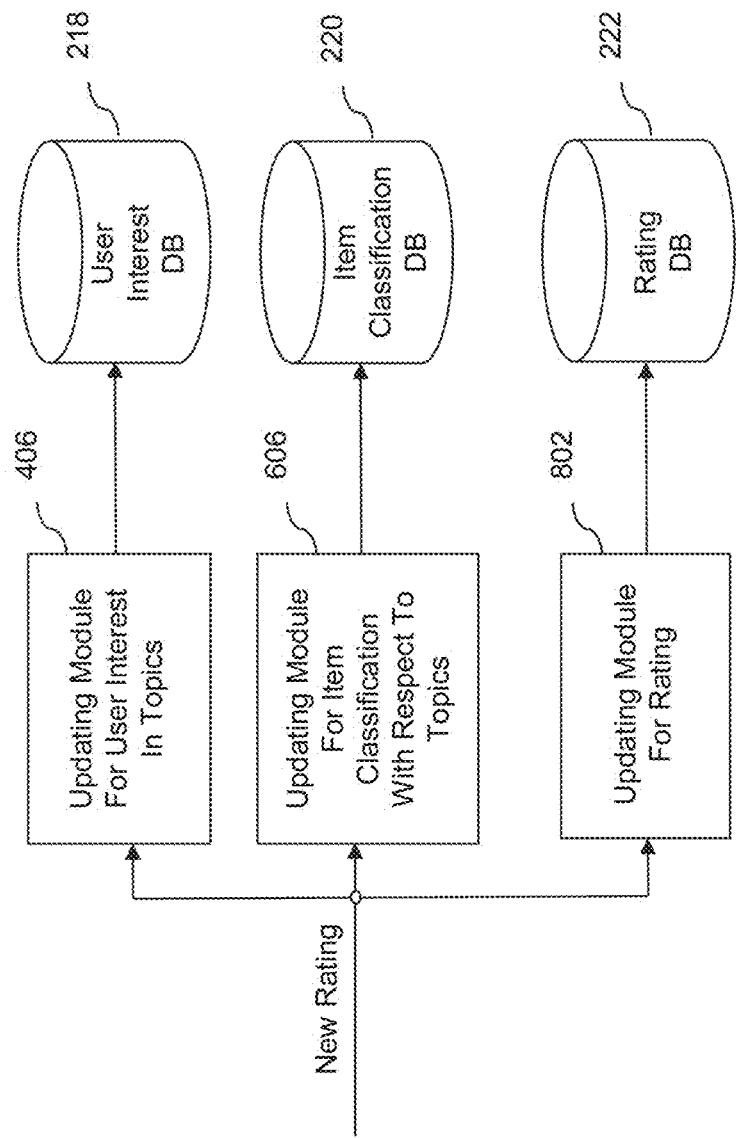
FIG. 8 illustrates an exemplary system diagram of a content recommendation system when the event from the data stream is determined to be a new rating.

FIG. 8 illustrates an exemplary system diagram of a content recommendation system when the event from the data stream is determined to be a new rating. The content recommendation system according to the illustrated embodiment may include updating module for user interest in topics 406 (as illustrated in FIG. 4), updating module for item classification with respect to topics 606 (as illustrated in FIG. 6), and updating module for rating 802. Updating module for user interest in topics 406 and updating module for item classification with respect to topics 606 are described above and therefore, are not detailed herein. Updating module for rating 802 is configured to update a user's rating on an item based on the received new rating.

Figure 9:
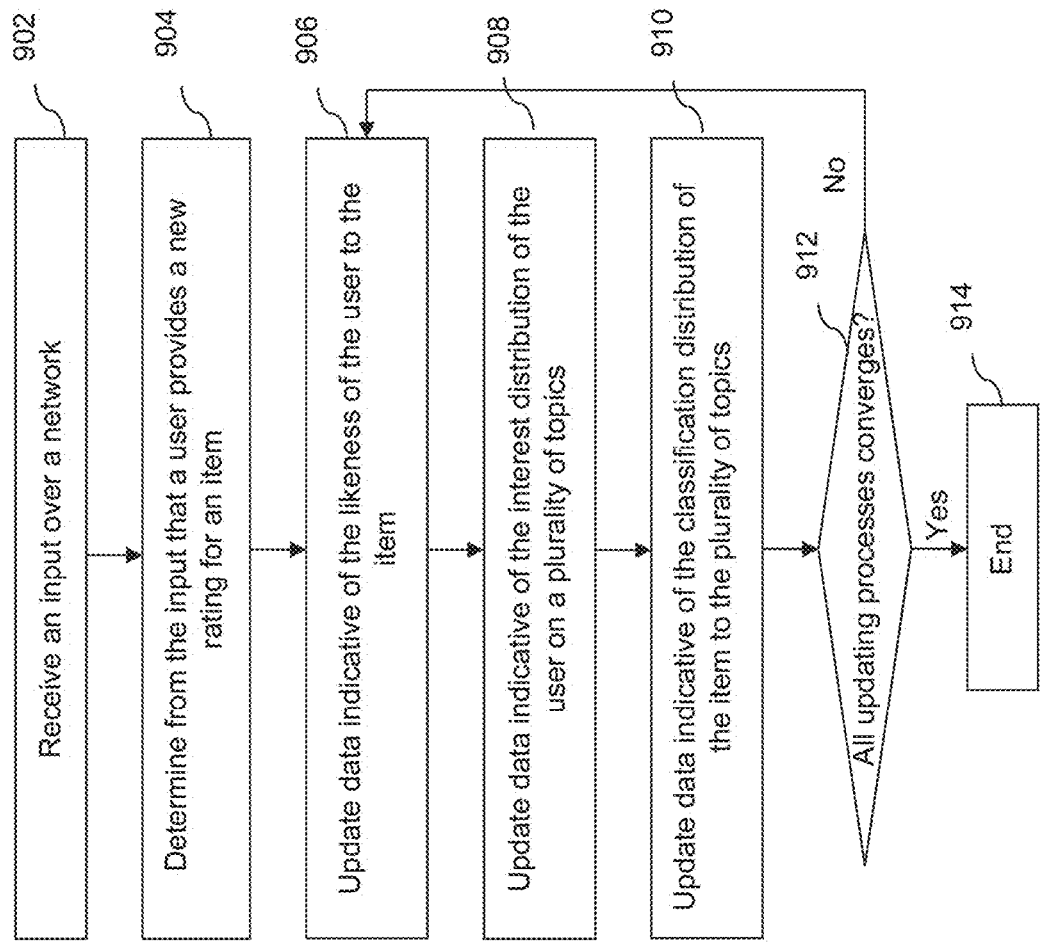
FIG. 9 illustrates an exemplary flowchart of the content recommendation system when the event from the data stream is determined to be a new rating.

FIG. 9 illustrates an exemplary flowchart of the content recommendation system when the event from the data stream is determined to be a new rating. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 9 and described below is not intended to be limiting. At 902, an input is received from a network; at 904, a determination is made that the input is related to a new rating of a user for an item; at 906, data indicative of the likeness of the user to the item is updated; at 908, data indicative of the interest distribution of the user on the plurality of topics is updated; at 910, data indicative of the classification distribution of the item with respect to the plurality of topics is updated; at 912, a determination is made as to whether all updating processes converge; and at 914, if it is determined that all updating processes converge, the process ends.

Figure 10:
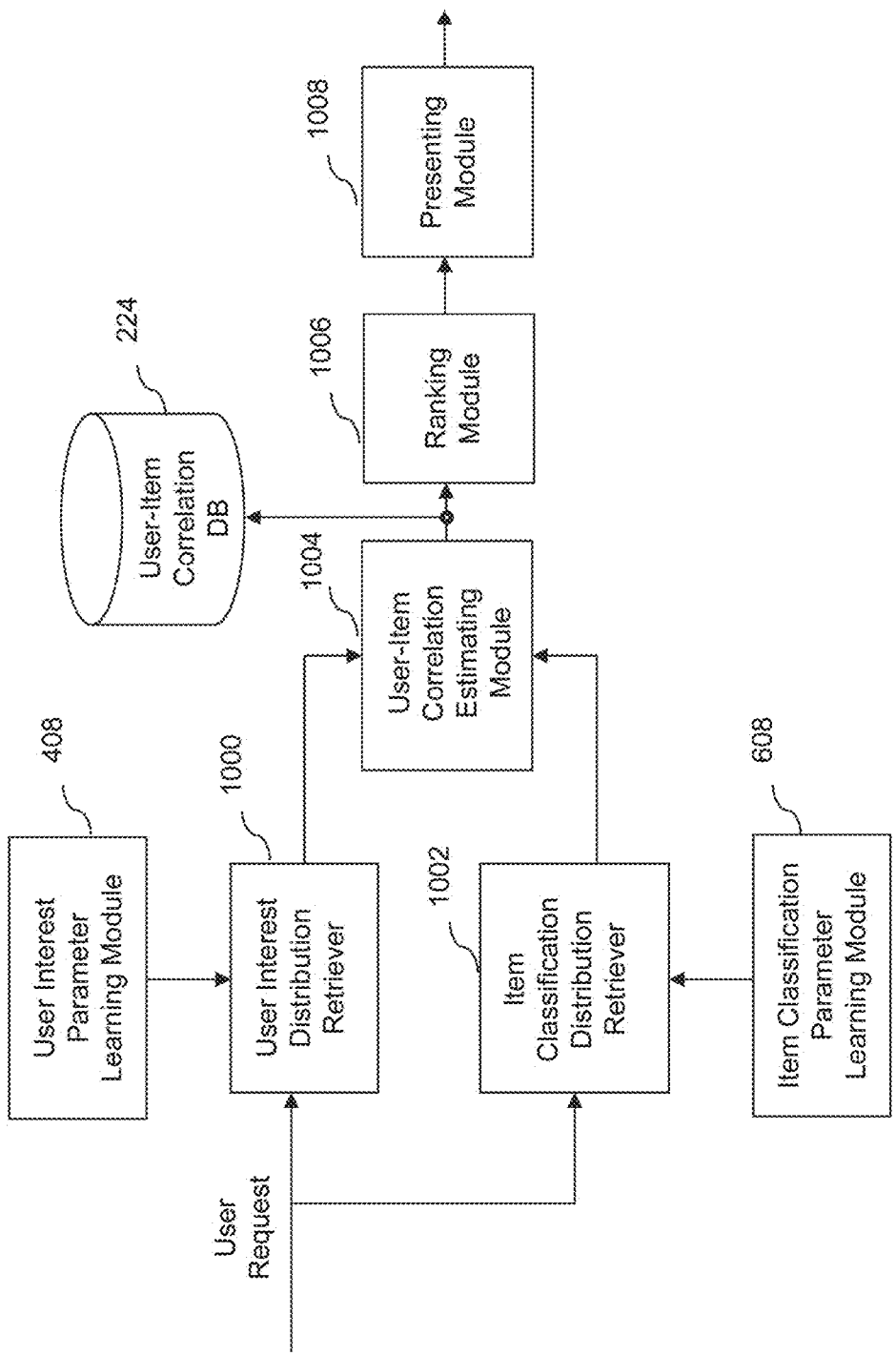
FIG. 10 illustrates an exemplary system diagram of a content recommendation system when the event from the data stream is determined to be a user request.

FIG. 10 illustrates an exemplary system diagram of a content recommendation system when the event from the data stream is determined to be a user request. The content recommendation system according to the illustrated embodiment may include a user interest parameter learning module 408, a user interest distribution retriever 1000, an item classification parameter learning module 608, an item classification distribution retriever 1002, a user-item correlation estimating module 1004, a ranking module 1006, and a presenting module 1008. User interest parameter learning module 408 and item classification parameter learning module 608 are described above, and therefore, are not detailed herein. User interest distribution retriever 1000 receives a user request and retrieves a set of values indicating the user's interest distribution on a plurality of topics. For example, the set of values {0.1, 0.4, 0.2, 0.2, 0.1} with respect to topics {thriller, comedy, cartoon, drama, adventure} indicates that the user is mostly interested in a comedy type of movies, less interested in a cartoon and a drama types of movies, and least interested in a thriller and an adventure types of movies. Item classification distribution retriever 1002 is configured to retrieve a set of values for each item indicating the item's classification with respect to the plurality of topics. For example, for movie The Hunger Games, a set of values {0.1, 0.1, 0.1, 0.3, 0.4} with respect to topics {thriller, comedy, cartoon, drama, adventure} indicates that the movie is most frequently classified as an adventure type of movie, less frequently classified as a drama type of movie, and least frequently classified as a thriller, a comedy, and a cartoon types of movie.

User-item correlation estimating module 1004 receives the set of values indicating the user's interest distribution on a plurality of topics and sets of values for all items, each indicating one item's classification with respect to the plurality of topics, and estimates a set of user-item correlation values, each indicating a rating of the user to each item. In some embodiments, user-item correlation estimating module 1004 may retrieve information related to the user's ratings on all the existing items from user-item correlation database 224 as a reference to fine tune the new estimation. For example, if the estimation indicates a stronger correlation between the user and an adventure type of movie than other types of movies while the user's historical information indicates a stronger correlation between the user and a cartoon type of movie than other types of moves, the content recommendation system may further research the user's personal information to determine whether there is a shift of the user's interest from the cartoon type of movie to the adventure type of move. The content recommendation system may take a conservative evaluation of the user-item correlation if the shift of the user's interest is first observed in the past six months, e.g. assigning equal weight between the adventure type of movie and the cartoon type of movie. In some other embodiments, historical information related to the user-item correlation estimation and its feedback on recommendations may be applied as a variation factor to fine tune the new estimation. For example, if the historical information indicates a strongest correlation between the user and the action type of movie, but the feedback on recommendations based on noted user-item correlation indicates that user actually favors adventure type of movie; such information may be quantized as a deviation factor to tune the new estimation. Ranking module 1006 is configured to rank the set of user-item correlation values and presenting module 1008 is configured to present the recommendations based on the results from ranking module 1006.

In some embodiments, the number of topics that represent the classification of the items may be determined based on the user feedback and feedback on the items from all available sources. The number of topics may be adjusted based on the performance of the content recommendation system. In some embodiments, the user may demonstrate interest shifting on topics with respect to the time space. For example, a teenage may be more interested in an adventure type of movie than a cartoon type of movie, and the interest may keep changing along the years the teenage grows. In yet another example, a people in his 20's may be more interested in career related news items than scientific adventure related news item. In some other embodiments, the items may also demonstrate a topic shifting or a genre shifting with respect to the time space. For example, a movie that falls more frequently into an action type of movie five years ago may be classified more as an adventure type of movie in the past year. In yet another example, a news item that is classified as an advertisement such as Uber, Airbnb, etc. a few years back is presently classified as a financial related news item after Uber and Airbnb seek venture capital founding. Depending on the nature of the item, the topic shifting or a genre shifting may be fast such as news items or slow such as movies. The present teaching proposes a recommendation scheme by analyzing the real-time streamed data, and therefore, can capture the temporal dynamics under streaming settings and make real-time recommendations to users.

Figure 11:
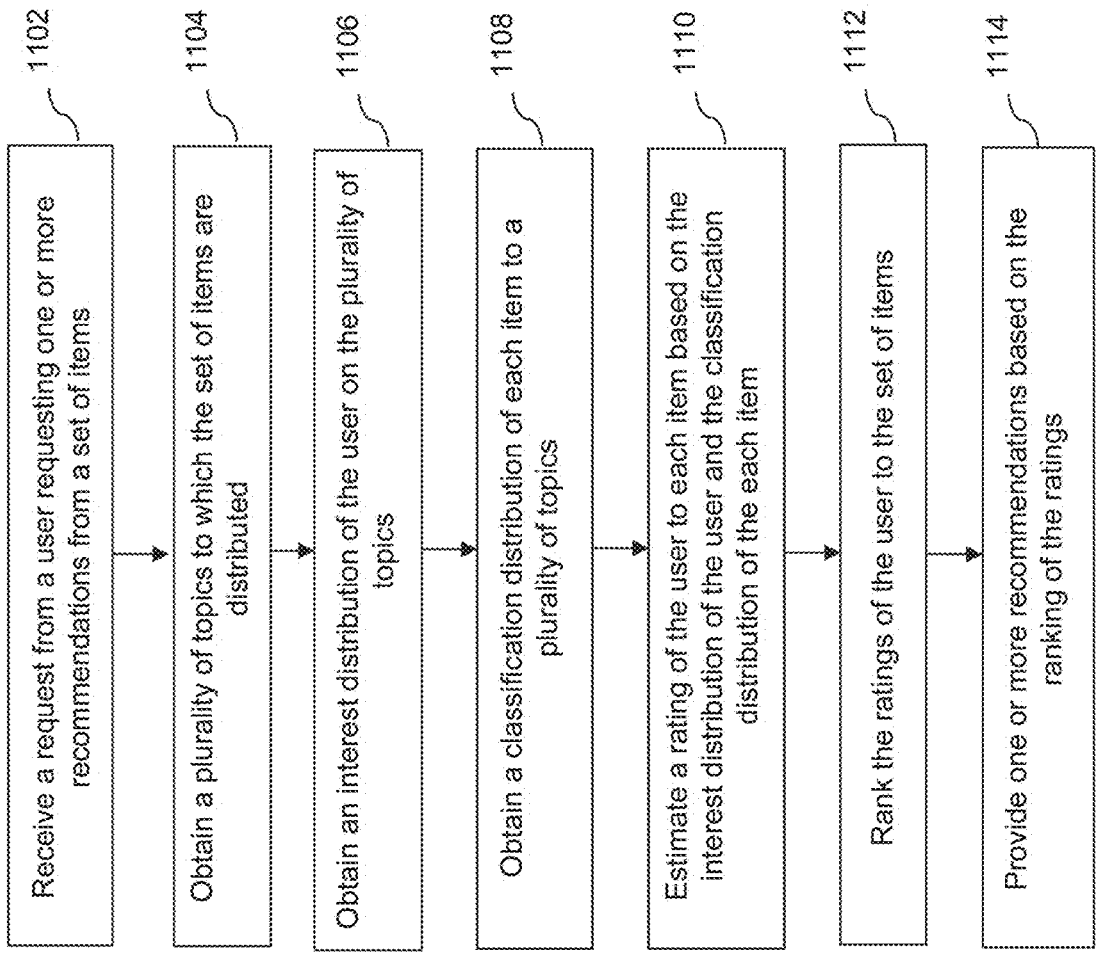
FIG. 11 illustrates an exemplary flowchart of the content recommendation system when the event from the data stream is determined to be a user request.

FIG. 11 illustrates an exemplary flowchart of the content recommendation system when the event from the data stream is determined to be a user request. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 11 and described below is not intended to be limiting. At 1102, a request from a user is received requesting one or more recommendations from a set of items; at 1104, a plurality of topics to which the set of items are distributed are obtained; at 1106, an interest distribution of the user on the plurality of topics is obtained; at 1108, a classification distribution of each item to a plurality of topics is obtained; at 1110, a rating of the user to each item is obtained based on the interest distribution of the user and the classification distribution of the each item; at 1112, the ratings of the user to the set of items are ranked; and at 1114, one or more recommendations are provided based on the rankings of the ratings.

Figure 12:
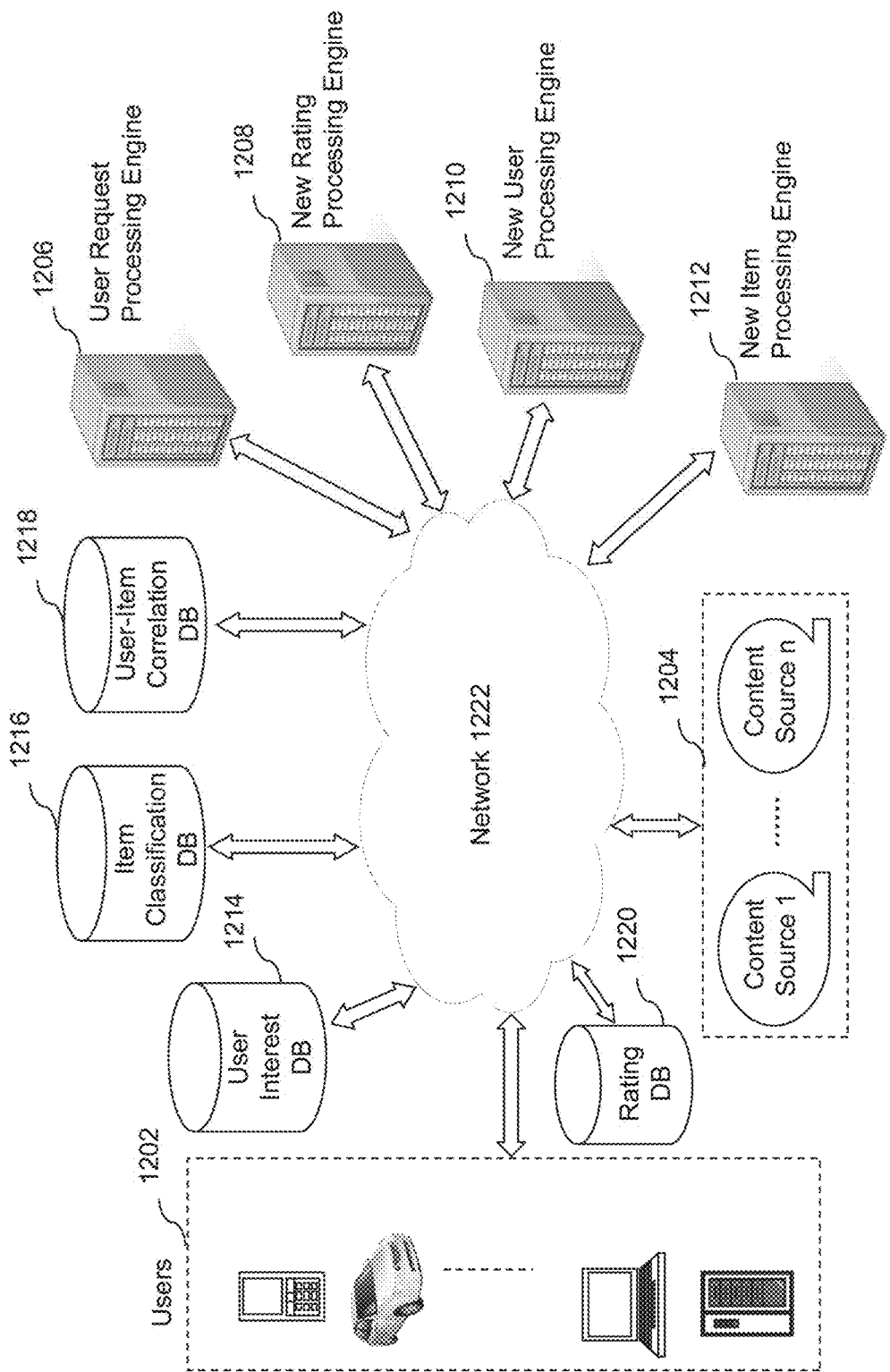
FIG. 12 illustrates a network environment of a content recommendation system, according to an embodiment of the present teaching.

FIG. 12 illustrates a network environment of a content recommendation system, according to an embodiment of the present teaching. The network environment of a content recommendation system includes users 1202, a plurality of content sources 1204, a user request processing engine 1206, a new rating processing engine 1208, a new user processing engine 1210, a new item processing engine 1212, a user interest DB 1214, an item classification DB 1216, a user-item correlation DB 1218, a rating DB 1220, and a network 1222. The user 1202 may connect to the network via various types of devices, for example, a desktop computer, a laptop computer, a mobile device, a built-in device in a motor vehicle, etc. The network 1222 may be a single network or a combination of multiple networks. For example, the network 1222 may be a local area network (LAN), a wide area network (WAN), a public network, a private network, a proprietary network, a Public Telephone Switched Network (PSTN), the Internet, a wireless communication network, a virtual network, or any combination thereof. User request processing engine 1206, new rating processing engine 1208, new user processing engine 1210, and new item processing engine 1212 may be configured to connect to network 1222 individually and communicate with user interest DB 1214, item classification DB 1216, user-item correlation DB 1218, and rating DB 1220, respectively via network 1222 in response to an input via the network. The plurality of content sources 1204 may supplies new items, new ratings, etc. to update rating DB 1220 and item classification DB 1216. The above components of the network environment of a content recommendation system are for illustrative purpose, and may include more or less components than illustrated.

Figure 13:
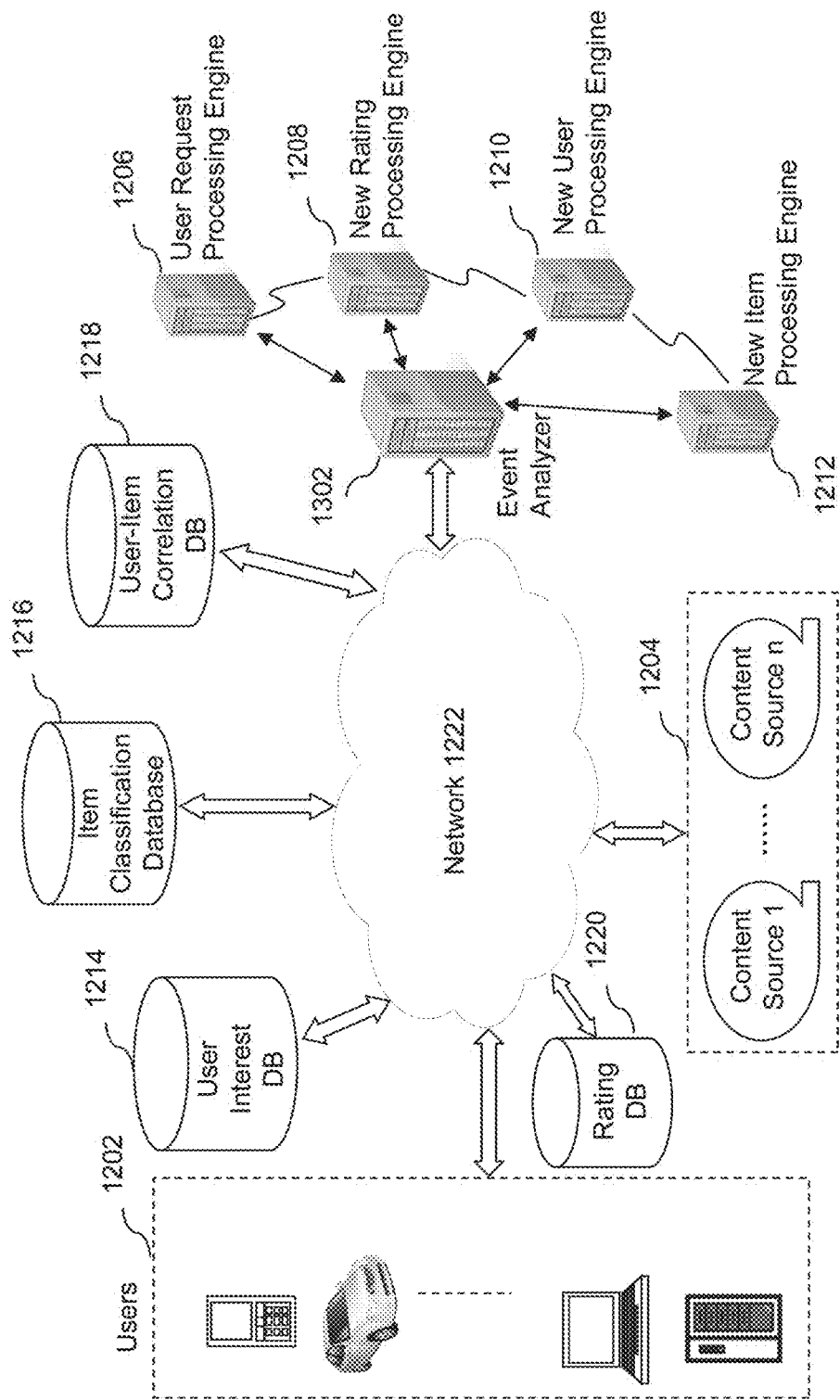
FIG. 13 illustrates a network environment of a content recommendation system, according to another embodiment of the present teaching.

FIG. 13 illustrates a network environment of a content recommendation system, according to another embodiment of the present teaching. The network environment illustrated herewith is similar to FIG. 12, except that user request processing engine 1206, new rating processing engine 1208, new user processing engine 1210, and new item processing engine 1212 are configured to connect to an event analyzer 1304, and via which, the above noted engines communicate with network 1222. User request processing engine 1206, new rating processing engine 1208, new user processing engine 1210, and new item processing engine 1212 may individually connected to event analyzer 1304. In some embodiments, the above noted engines may interconnect with each other, and/or may be further configured as one integrated component of the network environment.

Figure 14:
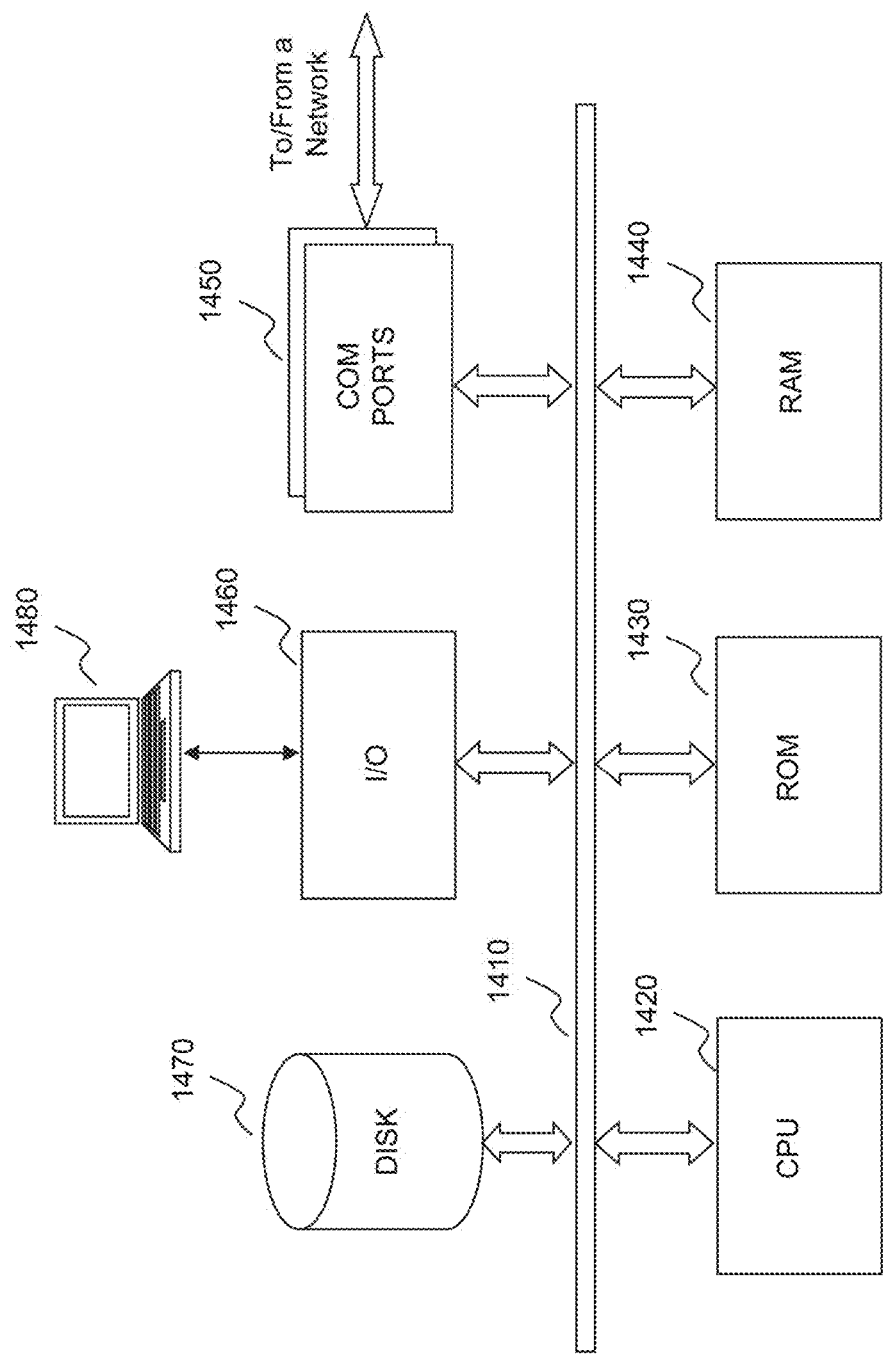
FIG. 14 depicts a general computer architecture on which the present teaching can be implemented.

FIG. 14 depicts a general computer architecture on which the present teaching can be implemented. The computer may be a general-purpose computer or a special purpose computer. This computer 1400 can be used to implement any components of the system for recommending content as described herein. Different components of the systems disclosed in the present teaching can all be implemented on one or more computers such as computer 1400, via its hardware, software program, firmware, or a combination thereof. Although only one such computer is shown, for convenience, the computer functions relating to content recommendation may be implemented in a distributed fashion on a number of similar platforms, to distribute the processing load.

The computer 1400, for example, includes COM ports 1402 connected to and from a network connected thereto to facilitate data communications. The computer 1400 also includes a CPU 1404, in the form of one or more processors, for executing program instructions. The exemplary computer platform includes an internal communication bus 1406, program storage and data storage of different forms, e.g., disk 1408, read only memory (ROM) 1410, or random access memory (RAM) 1412, for various data files to be processed and/or communicated by the computer, as well as possibly program instructions to be executed by the CPU 1404. The computer 1400 also includes an I/O component 1414, supporting input/output flows between the computer and other components therein such as user interface elements 1416. The computer 1400 may also receive programming and data via network communications.

Hence, aspects of the methods of recommending content, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a computer device having at least one processor, storage, and a communication platform connected to a network for recommending content, the method comprising:

receiving, by an engine, a request from a user for one or more recommendations from a set of items;

obtaining, by the engine, in response to the request, an interest distribution having a first plurality of values each representing an interest of the user in a respective one of a plurality of topics, wherein the interest distribution is determined by a first initiation model based on activities of the user related to the set of items observed prior to receiving the request;

obtaining, by the engine, in response to the request, for each of the set of items, a classification distribution having a second plurality of values each representing a frequency of the item being classified into a respective one of the plurality of topics, wherein the classification distribution is determined by a second initiation model based on activities performed with respect to the item by one or more other users observed prior to receiving the request;

estimating, by the engine with respect to the set of items, a set of correlation values based on the interest distribution and the classification distribution, wherein the set of correlation values is estimated in real-time to incorporate a perturbation factor observed up to a moment when the request is received, wherein the perturbation factor indicates a variation of a rating of the interest of the user with respect to each item, and wherein each of the set of correlation values indicates a rating of the user to each of the set of items;

retrieving, by the engine, historical data from a database;

comparing, by the engine, the set of correlation values with the retrieved historical data to determine a shift of the user's interest from one of the plurality of topics to another one of the plurality of topics within a predetermined time period;
adjusting, by the engine, the set of correlation values based on the shift of the user's interest;
selecting, by the engine, at least one item from the set of items to be recommended to the user based on the adjusted set of correlation values and information indicating previously provided ratings by the user with respect to at least some items;
providing, by the engine to the user, the one or more recommendations comprising the at least one item selected by the engine;
updating, by the engine, the database based on the adjusted set of correlation values;
receiving information associated with a new user;
obtaining a first reference distribution indicative of an average interest distribution of existing users in the plurality of topics, wherein the existing users comprise the one or more other users;
assigning the first reference distribution to the new user;
updating the existing users to include the new user;
receiving a new rating from the new user; and
updating data associated with the existing users indicative of the average interest distribution of the existing users in the plurality of topics based on the new rating.

2. The method of claim 1, wherein the interest distribution is determined in real-time based on the activities of the user related to the set of items observed up to a moment when the request is received.

3. The method of claim 1, wherein the classification distribution is determined in real-time based on the activities of the user and the activities performed with respect to each item of the set of items by the one or more other users observed up to a moment when the request is received.

4. The method of claim 1, further comprising:
receiving information associated with a new item;
obtaining a second reference distribution indicative of an average classification distribution of existing items with respect to the plurality of topics;
assigning the second reference distribution to the new item; and
updating the existing items to include the new item.

5. The method of claim 1, further comprising:
receiving a new rating of an existing item from an existing user;
updating the interest distribution associated with the existing user based on the new rating;
updating the classification distribution associated with the existing item based on the new rating; and
updating information related to the new rating indicative of the interest of the existing user in the existing item.

6. A system having at least one processor, storage, and a communication platform for recommending content, the system comprising:
a data interface, of an engine, implemented with the at least one processor and configured to receive a request from a user for one or more recommendations from a set of items, wherein the data interface is further configured to receive information associated with a new user;
a user interest distribution retriever, of the engine, implemented with the at least one processor and configured to obtain, in response to the request, an interest distribution having a first plurality of values each representing of an interest of the user in a respective one of a plurality of topics, wherein the interest distribution is determined based on activities of the user related to the set of items observed prior to receiving the request;
an item classification distribution retriever, of the engine, implemented with the at least one processor and configured to obtain, in response to the request, for each of the set of items, a classification distribution having a second plurality of values each representing a frequency of the item being classified into a respective one of the plurality of topics, wherein the classification distribution is determined by a second initiation model based on activities performed with respect to the item by one or more other users observed prior to receiving the request;
a user-item correlation estimating module, of the engine, implemented with the at least one processor and configured to:
estimate, with respect to the set of items, a set of correlation values based on the interest distribution and the classification distribution, wherein the set of correlation values is estimated in real-time to incorporate a perturbation factor observed up to a moment when the request is received, wherein the perturbation factor indicates a variation of a rating of the interest of the user with respect to each item, and wherein each of the set of correlation values indicates a rating of the user to each of the set of items,
retrieve historical data from a database,
compare the set of correlation values with the retrieved historical data to determine a shift of the user's interest from one of the plurality of topics to another one of the plurality of topics within a predetermined time period, and
adjust the set of correlation values based on the shift of the user's interest;
a ranking module, of the engine, implemented with the at least one processor and configured to select at least one item from the set of items to be recommended to the user based on the adjusted set of correlation values and information indicating previously provided ratings by the user with respect to at least some items;
a recommendation module, of the engine, implemented with the at least one processor and configured to provide the one or more recommendations comprising the at least one item selected by the engine;
an updating module, of the engine, implemented with the at least one processor and configured to update the database based on the adjusted set of correlation values;
a user interest reference retriever implemented with the at least one processor and configured to obtain a first reference distribution indicative of an average interest distribution of existing users in the plurality of topics, wherein the existing users comprise the one or more other users;
a user interest initializing module implemented with the at least one processor and configured to assign the first reference distribution to the new user; and
a first updating module implemented with the at least one processor and configured to update the existing users to include the new user, wherein:
a new rating is received from the new user, and
data associated with the existing users indicative of the average interest distribution of the existing users in the plurality of topics is updated based on the new rating.

7. The system of claim 6, wherein the interest distribution is determined in real-time based on the activities of the user related to the set of items observed up to a moment when the request is received.

8. The system of claim 6, wherein the classification distribution is determined in real-time based on the activities of the user and the activities performed with respect to each item of the set of items by the one or more other users observed up to a moment when the request is received.

9. The system of claim 6, wherein the data interface is further configured to receive information associated with a new item, and the system further comprises:
    an item classification reference retriever configured to obtain a second reference distribution indicative of an average classification distribution of existing items with respect to the plurality of topics;
    an item classification initializing module implemented with the at least one processor and configured to assign the second reference distribution to the new item; and
    a second updating module implemented with the at least one processor and configured to update the existing items to include the new item.

10. The system of claim 6, wherein the data interface is further configured to receive a new rating of an existing item from an existing user, and the system further comprises:
    a first updating module implemented with the at least one processor and configured to update the interest distribution associated with the existing user based on the new rating;
    a second updating module implemented with the at least one processor and configured to update the classification distribution associated with the existing item based on the new rating; and
    a third updating module implemented with the at least one processor and configured to update information related to the new rating indicative of the interest of the existing user in the existing item based on the new rating.

11. A non-transitory machine-readable medium having information recorded thereon for recommending content, wherein the information, when read by an engine, effectuate operations comprising:
    receiving, by the engine, a request from a user requesting one or more recommendations from a set of items;
    obtaining, by the engine, in response to the request, an interest distribution having a first plurality of values each representing an interest of the user in a respective one of a plurality of topics, wherein the interest distribution is determined by a first initiation model based on activities of the user related to the set of items observed prior to receiving the request;
    obtaining, by the engine, for each of the set of items, a classification distribution having a second plurality of values each representing a frequency of the item being classified into a respective one of the plurality of topics, wherein the classification distribution is determined by a second initiation model based on activities performed with respect to the item by one or more other users observed prior to receiving the request;
    estimating, by the engine with respect to the set of items, a set of correlation values based on the interest distribution and the classification distribution, wherein the set of correlation values is estimated in real-time to incorporate a perturbation factor observed up to a moment when the request is received, wherein the perturbation factor indicates a variation of a rating of the interest of the user with respect to each item, and wherein each of the set of correlation values indicates a rating of the user to each of the set of items;
    retrieving, by the engine, historical data from a database;
    comparing, by the engine, the set of correlation values with the retrieved historical data to determine a shift of the user's interest from one of the plurality of topics to another one of the plurality of topics within a predetermined time period;
    adjusting, by the engine, the set of correlation values based on the shift of the user's interest;
    selecting, by the engine, at least one item from the set of items to be recommended to the user based on the adjusted set of correlation values and information indicating previously provided ratings by the user with respect to at least some items;
    providing, by the engine, the one or more recommendations comprising the at least one item selected by the engine;
    updating, by the engine, the database based on the adjusted set of correlation values;
    receiving information associated with a new user;
    obtaining a first reference distribution indicative of an average interest distribution of existing users in the plurality of topics, wherein the existing users comprise the one or more other users;
    assigning the first reference distribution to the new user;
    updating the existing users to include the new user;
    receiving a new rating from the new user; and
    updating data associated with the existing users indicative of the average interest distribution of the existing users in the plurality of topics based on the new rating.

12. The medium of claim 11, wherein the interest distribution is determined in real-time based on the activities of the user related to the set of items observed up to a moment when the request is received.

13. The medium of claim 11, wherein the classification distribution is determined in real-time based on the activities of the user and the activities performed with respect to each item of the set of items by the one or more other users observed up to a moment when the request is received.

14. The medium of claim 11, wherein the operations further comprise:
    receiving information associated with a new item;
    obtaining a second reference distribution indicative of an average classification distribution of existing items with respect to the plurality of topics;
    assigning the second reference distribution to the new item; and
    updating the existing items to include the new item.

* * * * *